US012528354B2

(12) United States Patent
Ryu et al.

(10) Patent No.: US 12,528,354 B2
(45) Date of Patent: Jan. 20, 2026

(54) INSTRUMENT PANEL FOR VEHICLE

(71) Applicant: TOYOTA JIDOSHA KABUSHIKI KAISHA, Toyota (JP)

(72) Inventors: Sangbin Ryu, Kariya (JP); Matheus Mesquita Da Silva, Toyota (JP); Kagemaru Kitamura, Toyota (JP); Mitsuhiro Kato, Kariya (JP); Ryo Kunikata, Kariya (JP); Taishi Mochizuki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/734,503

(22) Filed: Jun. 5, 2024

(65) Prior Publication Data

US 2024/0408964 A1 Dec. 12, 2024

(30) Foreign Application Priority Data

Jun. 9, 2023 (JP) .................................. 2023-095387

(51) Int. Cl.
*B60K 35/50* (2024.01)
(52) U.S. Cl.
CPC .................................. *B60K 35/50* (2024.01)
(58) Field of Classification Search
CPC ......... B60K 35/50; B60K 37/00; B60K 37/20
See application file for complete search history.

(56) References Cited

U.S. PATENT DOCUMENTS

| 4,962,601 | A | * | 10/1990 | Gold | ........................ | B60J 10/25 |
| | | | | | | 49/377 |
| 5,860,688 | A | * | 1/1999 | Biondo | .................... | B60J 10/70 |
| | | | | | | 296/93 |
| 12,227,060 | B2 | * | 2/2025 | Pelic | ........................ | B60J 10/27 |

(Continued)

FOREIGN PATENT DOCUMENTS

| CN | 111660906 | A | * | 9/2020 | ............. | B60N 3/102 |
| DE | 19744684 | A1 | * | 4/1999 | .............. | B60J 10/25 |

(Continued)

OTHER PUBLICATIONS

Team Scottys youtube.com video titled "How to install Dash Speakers" dated Feb. 16, 2011, https://www.youtube.com/watch?v=GONC_ktRRrE (Year: 2011).*

*Primary Examiner* — Terrell L Mckinnon
*Assistant Examiner* — Ding Y Tan
(74) *Attorney, Agent, or Firm* — Finnegan, Henderson, Farabow, Garrett and Dunner, LLP

(57) ABSTRACT

An instrument panel includes a groove extending in a direction intersecting with a vehicle width direction and provided on one side of an opening of the instrument panel in the vehicle width direction, at a position offset from the opening in the vehicle width direction, and a first stepped portion and a second stepped portion that are configured to restrain liquid from flowing toward the opening in a case where the liquid flows into the groove and overflows the groove. In this configuration, since dripping of the liquid to an inside of the instrument panel is suppressed, the dripping of the liquid onto target components disposed below the opening is suppressed, without a need to provide a liquid shielding plate or a drip-proof sheet.

5 Claims, 4 Drawing Sheets

(56) References Cited

U.S. PATENT DOCUMENTS

| | | | |
|---|---|---|---|
| 2005/0151395 A1* | 7/2005 | Hoefer | B60J 10/72 |
| | | | 296/208 |
| 2010/0066129 A1* | 3/2010 | Edwards | B60R 13/07 |
| | | | 296/208 |
| 2017/0137068 A1* | 5/2017 | Kempfer | B60H 1/28 |
| 2018/0037175 A1* | 2/2018 | Tsutsumi | B60J 10/25 |
| 2018/0126834 A1* | 5/2018 | Krishnan | B60J 10/25 |
| 2018/0361923 A1* | 12/2018 | Hayashida | B60Q 3/64 |
| 2019/0047418 A1* | 2/2019 | Yoshimura | B60K 35/231 |
| 2022/0315123 A1* | 10/2022 | Mogi | B62D 25/081 |

FOREIGN PATENT DOCUMENTS

| | | | | |
|---|---|---|---|---|
| JP | H 07-090731 A | | 10/1995 | |
| JP | 2007055440 A | * | 3/2007 | |
| JP | 2020142637 A | * | 9/2020 | B60R 13/08 |

* cited by examiner

INSTRUMENT PANEL FOR VEHICLE

CROSS-REFERENCE TO RELATED APPLICATION

This application claims priority to Japanese Patent Application No. 2023-095387 filed on Jun. 9, 2023, incorporated herein by reference in its entirety.

BACKGROUND

1. Technical Field

The present disclosure relates to an instrument panel for a vehicle. The present disclosure, more particularly, relates to measures to suppress dripping of liquid to an inside of the instrument panel in a case where the liquid is spilled on the instrument panel. Generally, an instrument panel in a narrow sense refers to an instrument unit in front of a driver seat. However, the instrument panel in this specification refers to a component (including a portion called a dashboard) disposed between one end and the other end of a vehicle cabin in a vehicle width direction, at a front region of the vehicle cabin. That is, the instrument panel in this specification is an instrument panel in a wide sense.

2. Description of Related Art

Conventionally, as disclosed in Japanese Examined Patent Publication No. 7-90731 (JP 7-90731 B), for example, a wire harness for supplying power and sending control signals to various electrical components mounted in a vehicle and a wire harness connector (hereinafter simply referred to as a connector) to which the wire harness is connected are disposed inside an instrument panel for the vehicle. JP 7-90731 B discloses a configuration in which the instrument panel includes two parts, an upper instrument panel portion and a lower instrument panel portion, which are arranged in an up-down direction, and the wire harness is disposed therebetween.

SUMMARY

In general, an instrument panel has various openings such as an opening into which a speaker is to be fitted. As described above, a wire harness and a connector (which may be hereinafter referred to as target components) are disposed inside the instrument panel, and some of the target components may be disposed even below the openings.

In such a configuration, when an occupant spills liquid on the instrument panel (for example, by knocking over a cup or a plastic bottle that contains water), the liquid flows on an upper surface of the instrument panel. The liquid flows along a slope of the upper surface of the instrument panel. When any of the openings is present in the slope, the liquid may flow into the opening and then drip onto the target components through the opening. Therefore, liquid exposure preventive measures for the target components are required. The target components for which the liquid exposure preventive measures are required are not limited to the wire harness and the connector described above, but include various components which may fail by being exposed to the liquid.

As the liquid exposure preventive measures for the target components, it may be considered to provide a liquid shielding plate or a drip-proof sheet above each of the target components. In this case, the liquid shielding plate or the drip-proof sheet is to be produced as an additional component and fitted to the instrument panel or the like so as to be positioned above the target component inside the instrument panel.

However, such measures may bring various issues such as an increase in the number of components, an increase in man-hours for assembly, a significant increase in the vehicle weight, and a sharp rise in the cost.

The present disclosure has been made in view of such issues, and an object of the present disclosure is to provide an instrument panel for a vehicle configured to suppress dripping of liquid to an inside of the instrument panel, without causing the above-described issues (the issues that may be caused by providing the liquid shielding plate or the drip-proof sheet).

As a precondition, a solution to achieve the above-described object of the present disclosure is applied to an instrument panel for a vehicle. The instrument panel includes a groove extending in a direction intersecting with a vehicle width direction and provided at least on one side of an opening of the instrument panel in the vehicle width direction, at a position offset from the opening in the vehicle width direction, and a restraining portion configured to restrain liquid from flowing toward the opening in a case where the liquid flows into the groove and overflows the groove.

In this specific configuration, if an occupant spills liquid (e.g., water) on the instrument panel, the liquid flows on an upper surface of the instrumental panel. Once the liquid reaches the groove of the instrument panel, the liquid flows along the groove. In other words, the liquid flows in the direction intersecting with the vehicle width direction (for example, flows in a vehicle front-rear direction) at least on one side of the opening in the vehicle width direction, at a position offset from the opening in the vehicle width direction. At this time, when an amount of the spilled liquid is relatively large and the liquid overflows the groove, the restraining portion restrains the liquid from flowing toward the opening. This suppresses the liquid from flowing into the opening, so that the dripping of the liquid to the inside of the instrumental panel through the opening is suppressed. Even in a case where a target component (a wire harness or a connector) to be prevented from being exposed to the liquid is disposed below the opening inside the instrumental panel, the dripping of the liquid onto the target component is suppressed. As described above, in the case where the liquid shielding plate or the drip-proof sheet is provided above each of the target components as the liquid exposure preventive measure for the target components, the liquid shielding plate or the drip-proof sheet needs to be produced as an additional component and fitted to the instrument panel or the like so as to be positioned above the target component inside the instrument panel. On the other hand, since the dripping of the liquid to the inside of the instrument panel is suppressed with a presently proposed solution for the above-described issues, neither the liquid shielding plate nor the drip-proof sheet needs to be provided. That is, with the presently proposed solution, the dripping of the liquid onto the target components is suppressed, without causing an increase in the number of components or an increase in man-hours for assembly and also without causing a significant increase in the vehicle weight or a sharp rise in the cost.

A liquid guide is provided below the groove. The liquid guide is sloped so as to guide the liquid overflowing the groove in the direction intersecting with the vehicle width direction. The restraining portion includes a first stepped portion that is provided continuously with a portion of the liquid guide on the opening side and extends upwardly to restrain the liquid flowing in the liquid guide from flowing toward the opening.

This configuration causes the liquid overflowing the groove to be guided along the liquid guide in the direction intersecting with the vehicle width direction. Since the first stepped portion (the restraining portion) is provided continuously with the portion of the liquid guide on the opening side, the liquid flowing along the liquid guide is restrained from flowing toward the opening by the first stepped portion. This configuration suppresses the dripping of the liquid through the opening to the inside of the instrument panel.

The restraining portion includes a second stepped portion that extends upwardly from an edge of the opening to restrain the liquid flowing on the upper surface of the instrument panel from flowing toward the opening.

In this configuration, since the second stepped portion (the restraining portion) is provided at the edge of the opening, even in a case where the liquid overflowing the groove flows on the upper surface of the instrument panel, the liquid flowing on the upper surface of the instrument panel is restrained from flowing toward the opening by the second stepped portion. In this case, the dripping of the liquid through the opening to the inside of the instrument panel is also suppressed.

The instrument panel includes an instrument panel body, and an instrument panel cover mounted above the instrument panel body. The opening is provided in the instrument panel body, the groove is integrally molded into the instrument panel cover, and the restraining portion is integrally molded into the instrument panel body.

In this way, when the instrument panel includes a plurality of members, by providing each of the members with a functional portion (the groove of the instrument panel cover and the restraining portion of the instrument panel body) for suppressing the liquid from flowing into the opening, the members effectively achieve a function to suppress the liquid from flowing into the opening while the members are easily molded.

The opening is a speaker mounting opening into which a speaker is to be fitted and mounted.

The speaker mounting opening is a relatively large opening among various openings that are provided in the instrument panel. Therefore, there is a concern that the liquid may flow into the speaker mounting opening if the liquid is spilled on the instrument panel. However, with the presently proposed solution, the groove and the restraining portion are provided for suppressing the liquid from flowing into the speaker mounting opening. As a result, the liquid can be suppressed from flowing into the speaker mounting opening, and the dripping of the liquid to the inside of the instrument panel through the speaker mounting opening can be suppressed.

In the present disclosure, the instrument panel includes the groove extending in the direction intersecting with the vehicle width direction and provided at least on one side of the opening of the instrument panel in the vehicle width direction, at a position offset from the opening in the vehicle width direction, and the restraining portion configured to restrain the liquid from flowing toward the opening in the case where the liquid flows into the groove and overflows the groove. In this configuration, since the dripping of the liquid to the inside of the instrument panel is suppressed, neither the liquid shielding plate nor the drip-proof sheet needs to be provided. That is, in the present disclosure, in a case where the target component is disposed below the opening, the dripping of the liquid onto the target component is suppressed, without causing an increase in the number of components or an increase in the man-hours for assembly and also without causing a significant increase in the vehicle weight or a sharp rise in the cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following will describe an embodiment of the present disclosure with reference to the accompanying drawings. The embodiment to be described below is about a case where the present disclosure is applied to an instrument panel for a vehicle having a configuration in which speakers are provided respectively on opposite sides of the instrument panel in a vehicle width direction.

Figure 1:
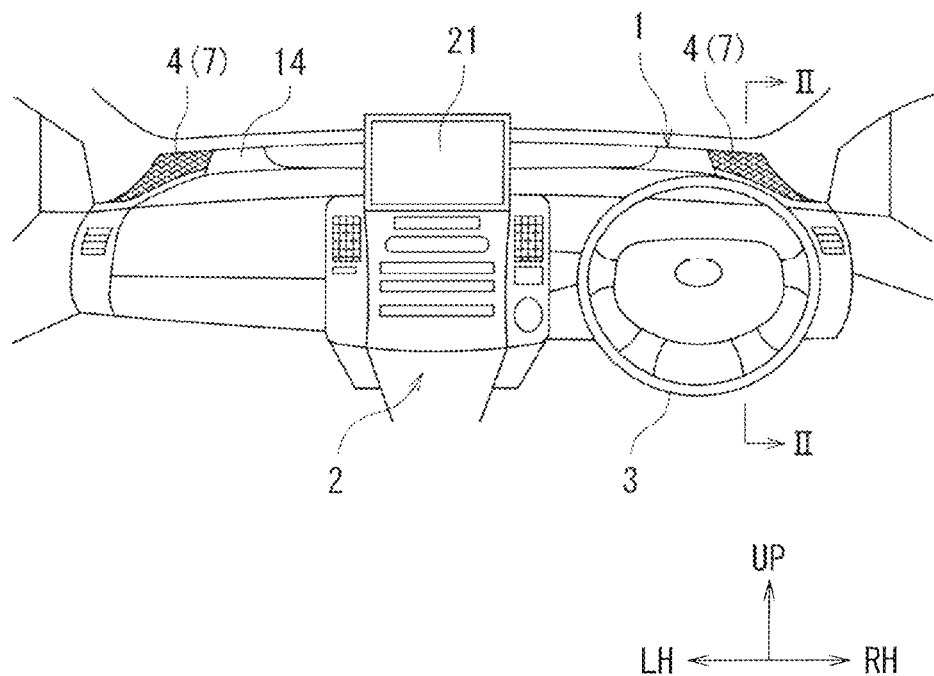
FIG. 1 is a view illustrating a part of a vehicle around an instrument panel for the vehicle, according to an embodiment, as viewed from the rear of the vehicle.

FIG. 1 is a view illustrating a part of a vehicle around an instrument panel 1 for the vehicle, according to the present embodiment, as viewed from the rear of the vehicle. In FIG. 1, an arrow UP indicates an upward direction, an arrow RH indicates a right side of the vehicle in the vehicle width direction, and an arrow LH indicates a left side of the vehicle in the vehicle width direction.

As illustrated in FIG. 1, the instrument panel 1 is disposed in front of a driver seat and a passenger seat. The instrument panel 1 is an interior member that covers a part of the vehicle in front of the driver seat and the passenger seat, and has a lamination structure including, for example, a base material, a shock absorbing material, and a covering material. A center cluster 2 is disposed at the center of the instrument panel 1. The center cluster 2 includes a display 21 for a car navigation system and various switches. A steering wheel 3 is disposed at a position on a right-side portion of the instrument panel 1 in the vehicle width direction.

Figure 2:
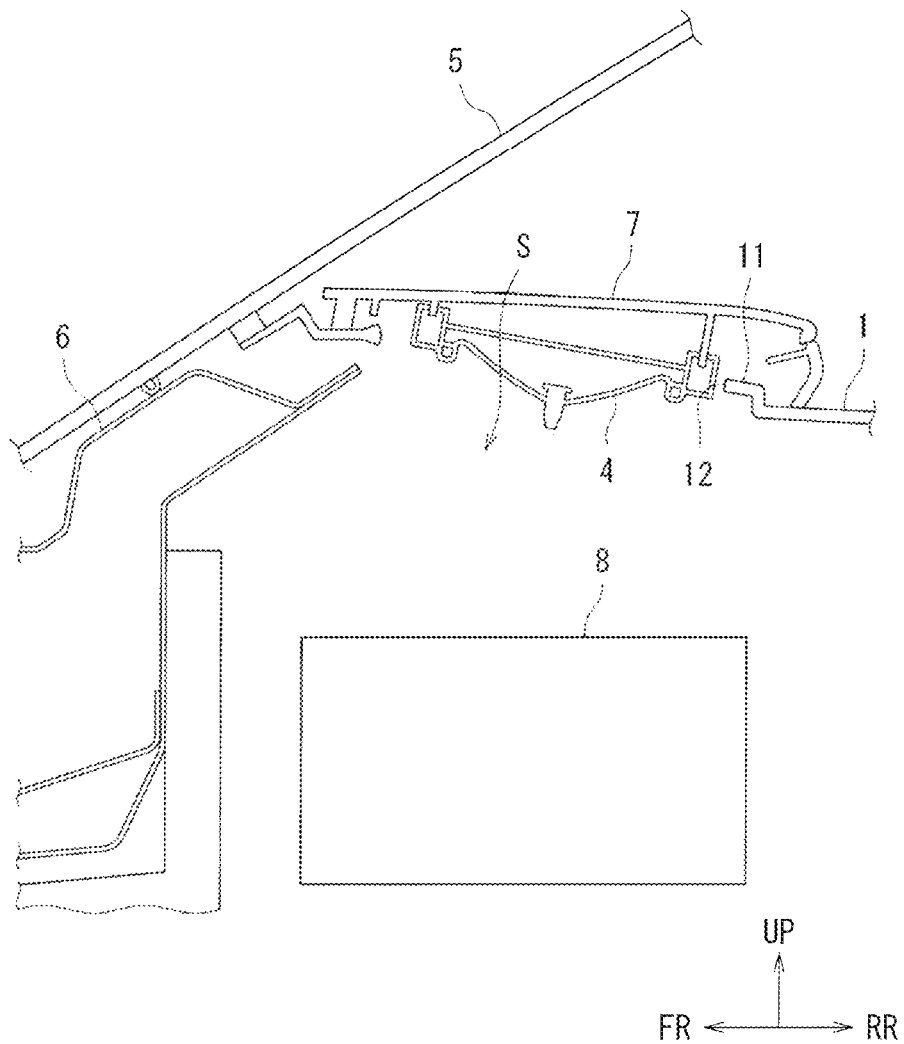
FIG. 2 is a cross-sectional view taken along line II-II of FIG. 1.

Speaker units 4 are disposed at positions respectively close to right and left ends of the instrument panel 1, on an upper surface of the instrument panel 1. The following will describe a configuration around the position where the speaker unit 4 is disposed. FIG. 2 is a cross-sectional view taken along line II-II of FIG. 1. In FIG. 2, the arrow UP indicates the upward direction, an arrow FR indicates the front of the vehicle, and an arrow RR indicates the rear of the vehicle.

The cross-sectional view of FIG. 2 illustrates a front windshield 5, a cowl 6, the instrument panel 1, one of the speaker units 4, a speaker cover 7, and a wire harness 8, as vehicle components. The wire harness 8 is disposed in a rectangle area illustrated in FIG. 2.

The front windshield 5 is disposed in the front of a vehicle cabin in a vehicle front-rear direction. The cowl 6 extends in the vehicle width direction and supports a lower end portion of the front windshield 5. In an internal space S defined by the instrument panel 1, the wire harness 8 for supplying power and sending control signals to various electrical components mounted in the vehicle and a connector to which the wire harness 8 is connected are disposed. In particular, in case of a battery electric vehicle or a plug-in hybrid electric vehicle, a high-voltage wire harness may be used as the wire harness 8.

The instrument panel 1 includes speaker mounting portions 11. The speaker mounting portions 11 are disposed at a front end portion of the instrument panel 1, respectively on opposite end portions of the instrument panel 1 in the vehicle width direction. The speaker mounting portion 11 on the right side and the speaker mounting portion 11 on the left side are arranged substantially symmetrical to each other.

Each of the speaker mounting portions 11 has an opening (which may be hereinafter referred to as a speaker mounting opening) 12, and the speaker unit 4 is fitted into the opening (speaker mounting opening) 12, so that the speaker unit 4 is mounted in the instrument panel 1. The speaker cover 7 is provided above the speaker unit 4 so as to cover the entire area of the speaker mounting portion 11. The speaker cover 7 has a grille (illustration omitted). The wire harness 8 and the connector (target components) are disposed below the opening 12.

Figure 3:
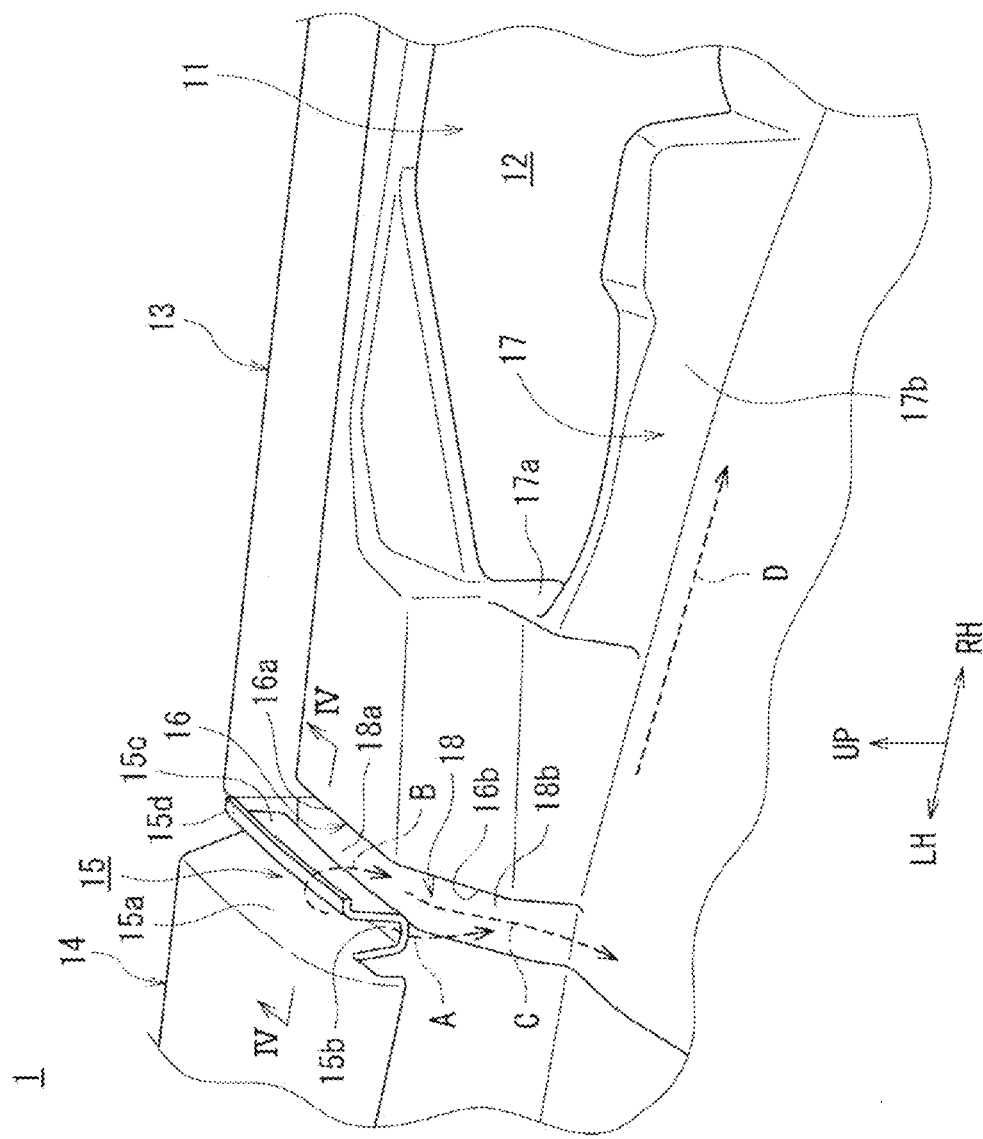
FIG. 3 is a perspective view illustrating a part of the instrument panel around a speaker mounting portion.
Figure 4:
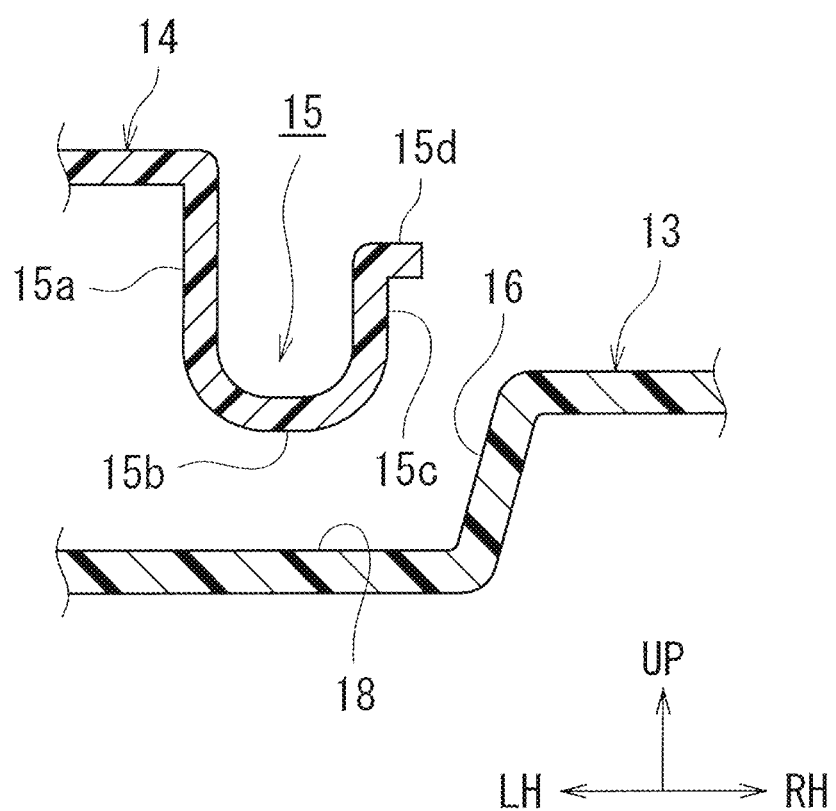
FIG. 4 is a cross-sectional view taken along line IV-IV of FIG. 3.

The following will now describe a configuration of a part of the instrument panel 1 around the speaker mounting portion 11, i.e., a feature of the present embodiment. FIG. 3 is a perspective view illustrating the part of the instrument panel 1 around the speaker mounting portion 11. FIG. 4 is a cross-sectional view taken along line IV-IV of FIG. 3. In FIGS. 3 and 4, the arrow UP indicates the upward direction, the arrow RH indicates the right side of the vehicle in the vehicle width direction, and the arrow LH indicates the left side of the vehicle in the vehicle width direction. FIG. 3 illustrates the speaker mounting portion 11 disposed on the right side in the vehicle width direction, in a state where the speaker cover 7 is removed. Therefore, in FIG. 3, the opening 12 of the speaker mounting portion 11 is visible.

As illustrated in FIG. 3, the instrument panel 1 includes an instrument panel body 13 made of resin, and an instrument panel cover 14 made of resin and mounted above the instrument panel body 13 (by clip fastening, for example). Specifically, the instrument panel cover 14 is disposed at a position above the instrument panel body 13 and inward of a position where the speaker cover 7 is mounted in the vehicle width direction. An upper surface of the speaker cover 7 and an upper surface of the instrument panel cover 14 are arranged to be flush with each other in a state where the speaker cover 7 is mounted above the instrument panel body 13 (see FIG. 1).

As described above, in the configuration in which the wire harness and the connector (the target components) are disposed below the opening into which the speaker unit is to be fitted, when an occupant spills liquid on the instrument panel (for example, by knocking over a cup or a plastic bottle that contains water), the liquid flows on the upper surface of the instrument panel. The liquid flows along a slope of the upper surface of the instrument panel, and when the opening is present in the slope, the liquid may flow into the opening and drip onto the target components through the opening. Therefore, liquid exposure preventive measures for the target components are required. As the liquid exposure preventive measure for the target components, it may be considered to provide a liquid shielding plate or a drip-proof sheet above each of the target components. In this case, the liquid shielding plate or the drip-proof sheet is to be produced as an additional component and fitted to the instrument panel or the like so as to be positioned above the target component inside the instrument panel. However, such measures may bring various issues such as an increase in the number of components, an increase in man-hours for assembly, a significant increase in the vehicle weight, and a sharp rise in the cost.

The present embodiment is configured to suppress the dripping of the liquid to the inside of the instrument panel 1 (onto the target components) by providing each of the instrument panel body 13 and the instrument panel cover 14 with a functional portion for suppressing the liquid from flowing into the opening 12, in order to avoid causing the above-described issues (the issues that may be caused by providing the liquid shielding plate or the drip-proof sheet). Specifically, a groove 15 is integrally molded into the instrument panel cover 14, and a first stepped portion 16 and a second stepped portion 17, each of which is an example of a restraining portion, are integrally molded into the instrument panel body 13. The following will specifically describe the above configuration.

The groove 15 is provided at an outer end portion of the instrument panel cover 14 in the vehicle width direction and extends in the vehicle front-rear direction. Specifically, the instrument panel cover 14 includes, at the outer end portion of the instrument panel cover 14 in the vehicle width direction, an inner vertical wall 15a extending substantially in a vertical direction (in a direction substantially perpendicular to the vehicle width direction), a bottom plate 15b extending outwardly from a lower end of the inner vertical wall 15a in the vehicle width direction by a predetermined length, and an outer vertical wall 15c extending upwardly from an outer end of the bottom plate 15b in the vehicle width direction. A space surrounded with the inner vertical wall 15a, the bottom plate 15b, and the outer vertical wall 15c is the groove 15 that is upwardly open and extends in the vehicle front-rear direction by a predetermined length.

An upper surface of the bottom plate 15b is a sloped surface sloping downwardly at a predetermined angle, toward an inner side of the vehicle cabin (toward the driver seat and the passenger seat). In this configuration, when the liquid flows into the groove 15, the liquid flows toward the inner side of the vehicle cabin and flows out of an open end of the groove 15 on the inner side of the vehicle cabin (see an arrow A indicated with a dashed line in FIG. 3).

A cross-sectional shape of the groove 15 that is specified by heights of the inner vertical wall 15a and the outer vertical wall 15c and a width of the bottom plate 15b (a dimension of the bottom plate 15b in the vehicle width direction) is determined as appropriate by an experiment or a simulation in view of a presumed amount of the liquid spilled on the instrument panel by the occupant. The cross-sectional shape of the groove 15 may be either uniform, or ununiform throughout the groove 15 in an extending direction of the groove 15.

In the present embodiment, a flange 15d is provided so as to extend slightly and outwardly in the vehicle width direction from an upper end of the outer vertical wall 15c.

A liquid guide 18 is provided in the instrument panel body 13, at a position below the groove 15. The liquid guide 18 has a function to receive the liquid when an amount of spilled liquid is relatively large and the liquid overflows the groove 15. An upper surface of the liquid guide 18 is a sloped surface sloping downwardly, toward the inner side of the vehicle cabin (toward the driver seat and the passenger seat). The sloped surface of the liquid guide 18 includes a front sloped surface 18a disposed on a vehicle front side and having a relatively small inclination angle, and a rear sloped surface 18b provided continuously with an end of the front sloped surface 18a on the inner side of the vehicle cabin and having a relatively large inclination angle. The sloped surface of the liquid guide 18 is not limited to the above-described configuration, but may be a sloped surface having a uniform inclination angle over the entire surface, or may include three or more sloped surfaces having different inclination angles from one another.

Since the liquid guide 18 as described above is provided, when the liquid overflows the groove 15 and is dropped onto the upper surface of the liquid guide 18 (see an arrow B indicated with a dashed line in FIG. 3), the liquid flows toward the inner side of the vehicle cabin along the liquid guide 18 (see an arrow C indicated with a dashed line in FIG. 3).

In addition, the instrument panel body 13 includes the first stepped portion 16 that is provided continuously with an outer end of the liquid guide 18 (a portion of the liquid guide 18 on the opening side) in the vehicle width direction and extends upwardly. The first stepped portion 16 has a function to restrain the liquid flowing in the liquid guide 18 from flowing toward the opening 12.

Specifically, the height of the first stepped portion 16 is predetermined by an experiment or a simulation to such a dimension that a liquid surface of the liquid flowing along the liquid guide 18 does not exceed the height thereof (an upper end of the first stepped portion 16) even when the amount of the spilled liquid is relatively large. More specifically, the first stepped portion 16 includes a front stepped portion 16a that matches with the front sloped surface 18a of the liquid guide 18 (disposed outward of the front sloped surface 18a in the vehicle width direction), and a rear stepped portion 16b that matches with the rear sloped surface 18b of the liquid guide 18 (disposed outward of the rear sloped surface 18b in the vehicle width direction). The heights of the front stepped portion 16a and the rear stepped portion 16b are predetermined to such dimensions that the liquid surface of the liquid flowing along the liquid guide 18 does not exceed the heights thereof even when the amount of the spilled liquid is relatively large.

The instrument panel body 13 includes the second stepped portion 17 extending upwardly from an edge of the opening 12 on the inner side of the vehicle cabin. The second stepped portion 17 is provided continuously with the outer side of the first stepped portion 16 in the vehicle width direction, and has a function to restrain the liquid flowing on the upper surface of the instrument panel 1 (see an arrow D indicated with a dashed line in FIG. 3) from flowing toward the opening 12.

Specifically, the second stepped portion 17 includes a front-rear stepped portion 17a that extends substantially in the vehicle front-rear direction (extending in the direction substantially perpendicular to the vehicle width direction), and a right-left stepped portion 17b that is provided continuously with an end of the front-rear stepped portion 17a on the inner side of the vehicle cabin and extends substantially in the vehicle width direction (extending in the direction substantially perpendicular to the vehicle front-rear direction). The heights of the front-rear stepped portion 17a and the right-left stepped portion 17b are predetermined by an experiment or a simulation to such dimensions that the liquid surface of the liquid flowing on the upper surface of the instrument panel 1 does not exceed the heights thereof (an upper end of the second stepped portion 17) even when the amount of the spilled liquid is relatively large.

The following will now describe a flow of liquid when the occupant spills the liquid on the instrument panel 1. In this case, the liquid flows on the upper surface of the instrument panel 1 (for example, the upper surface of the instrument panel cover 14). When the amount of spilled liquid is relatively small, the spilled liquid flows along the groove 15 once the spilled liquid reaches the groove 15 of the instrument panel cover 14. The liquid flows toward the inner side of the vehicle cabin and flows out from the open end of the groove 15 on the inner side of the vehicle cabin (see the arrow A indicated with the dashed line in FIG. 3).

On the other hand, when the amount of spilled liquid is relatively large and the liquid overflows the groove 15 and is dropped onto the upper surface of the liquid guide 18 (see the arrow B indicated with the dashed line in FIG. 3), the liquid flows along the liquid guide 18 toward the inner side of the vehicle cabin (see the arrow C indicated with the dashed line in FIG. 3). In this case, since the first stepped portion 16 is provided continuously with the outer end of the liquid guide 18 (the portion of the liquid guide 18 on the opening 12 side) in the vehicle width direction, the liquid flowing in the liquid guide 18 is restrained from flowing toward the opening 12.

In a case where, after flowing along the liquid guide 18, the liquid flows on an upper surface of the instrument panel body 13 (see the arrow D indicated with the dashed line in FIG. 3), since the second stepped portion 17 is provided at the edge of the opening 12 on the inner side of the vehicle cabin, the liquid flowing on the upper surface of the instrument panel body 13 is restrained from flowing toward the opening 12.

As described above, in the present embodiment, the instrument panel 1 includes the groove 15 extending in the direction intersecting with the vehicle width direction and provided on one side of the opening 12 of the instrument panel 1 in the vehicle width direction, at a position offset from the opening 12 in the vehicle width direction, and the first stepped portion 16 and the second stepped portion 17 each of which is an example of the restraining portion configured to restrain the liquid from flowing toward the opening 12 in a case where the liquid flows into the groove 15 and overflows the groove 15. In this configuration, since the dripping of the liquid to the inside of the instrument panel 1 is suppressed, neither the liquid shielding plate nor the drip-proof sheet needs to be provided. That is, the present embodiment suppresses the dripping of the liquid onto the target components (the wire harness 8 and the connector) disposed below the opening 12, without causing an increase in the number of components or an increase in the man-hours for assembly and also without causing a significant increase in the vehicle weight or a sharp rise in the cost.

In the present embodiment, the groove 15 is integrally molded into the instrument panel cover 14, and the first stepped portion 16 and the second stepped portion 17 are integrally molded into the instrument panel body 13. In this way, by providing each of the instrument panel body 13 and the instrument panel cover 14 with the functional portion for suppressing the liquid from flowing into the opening 12, the instrument panel body 13 and the instrument panel cover 14 effectively achieve a function to suppress the liquid from flowing into the opening 12 while the instrument panel body 13 and the instrument panel cover 14 can be easily molded.

In the present embodiment, the speaker mounting opening 12 is a target opening the dripping of the liquid from which is to be suppressed. The speaker mounting opening 12 is a relatively large opening among various openings provided in the instrument panel 1. Therefore, there is a concern that the liquid may flow into the speaker mounting opening 12 if the liquid is spilled on the instrument panel 1. However, the present embodiment includes the groove 15, the first stepped portion 16, and the second stepped portion 17 for suppressing the liquid from flowing into the speaker mounting opening 12. As a result, the liquid can be suppressed from flowing into the speaker mounting opening 12, and the dripping of the liquid to the inside of the instrument panel 1 through the speaker mounting opening 12 can be suppressed.

Other Embodiments

The present disclosure is not limited to the above-described embodiment, and all modifications and applications can be made within the scope of the claims and equivalent ranges thereof.

For example, in the above-described embodiment, a case where the target opening the dripping of the liquid from which is to be suppressed is the speaker mounting opening 12 has been described as an example. However, the present disclosure is not limited to this, but is applicable to another opening as a target opening the dripping of liquid from which is to be suppressed.

In the above-described embodiment, the groove 15 and the first stepped portion 16 are disposed inward of the opening (speaker mounting opening) 12 in the vehicle width direction. Instead of or in addition to this configuration, the present disclosure may have a configuration in which the groove and the first stepped portion are disposed outward of the opening 12 in the vehicle width direction.

In the above-described embodiment, the groove 15 extends in the vehicle front-rear direction. However, the extending direction is not limited to this. The groove 15 may extend in a direction inclined at a predetermined angle toward the vehicle width direction relative to the vehicle front-rear direction. That is, the groove 15 of the present disclosure only needs to "extend in a direction intersecting with the vehicle width direction".

The present disclosure is applicable to an instrument panel for a vehicle configured to prevent the wire harness and the like disposed inside the instrument panel from being exposed to liquid.

What is claimed is:

1. An instrument panel for a vehicle, the instrument panel comprising:
   an instrument panel body; and
   an instrument panel cover, wherein
   a groove in the instrument panel cover extends in a direction intersecting with a vehicle width direction, the groove being provided at least on one side of an opening of the instrument panel in the vehicle width direction, at a position offset from the opening in the vehicle width direction, and the groove being inclined downwardly at a predetermined angle toward an interior of the vehicle; and
   a restraining portion configured to restrain liquid from flowing toward the opening in a case where the liquid flows into the groove and overflows the groove.

2. The instrument panel according to claim 1,
   wherein a liquid guide is provided below the groove, the liquid guide being sloped so as to guide the liquid overflowing the groove in the direction intersecting with the vehicle width direction, and
   wherein the restraining portion includes a first stepped portion that is provided continuously with a portion of the liquid guide on the opening side and extends upwardly to restrain the liquid flowing in the liquid guide from flowing toward the opening.

3. The instrument panel according to claim 1, wherein the restraining portion includes a second stepped portion that extends upwardly from an edge of the opening to restrain the liquid flowing on an upper surface of the instrument panel from flowing toward the opening.

4. The instrument panel according to claim 1,
   wherein the instrument panel cover is mounted above the instrument panel body,
   wherein the opening is provided in the instrument panel body,
   wherein the groove is integrally molded into the instrument panel cover, and
   wherein the restraining portion is integrally molded into the instrument panel body.

5. The instrument panel according to claim 1, wherein the opening is a speaker mounting opening into which a speaker is to be fitted and mounted.

* * * * *